(12) United States Patent
Shah et al.

(10) Patent No.: US 7,555,499 B2
(45) Date of Patent: Jun. 30, 2009

(54) DIAGNOSING DATABASE PERFORMANCE PROBLEMS USING A PLURALITY OF WAIT CLASSES

(75) Inventors: Vipul Manubhai Shah, Foster City, CA (US); John Mark Beresniewicz, San Mateo, CA (US); Nauman Ahmed Chaudhry, New Orleans, LA (US); Kyle Hailey, San Francisco, CA (US); Hui Lin, Sunnyvale, CA (US); Hsiao-te Su, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 440 days.

(21) Appl. No.: 10/950,023

(22) Filed: Sep. 23, 2004

(65) Prior Publication Data

US 2006/0059205 A1 Mar. 16, 2006

Related U.S. Application Data

(60) Provisional application No. 60/602,437, filed on Aug. 17, 2004.

(51) Int. Cl.
*G06F 7/00* (2006.01)
*G06F 17/00* (2006.01)
*G06F 12/00* (2006.01)
*G06F 17/30* (2006.01)
*G06F 11/00* (2006.01)

(52) U.S. Cl. .................... 707/103 R; 707/101; 707/202; 714/1; 714/2; 714/15; 714/25; 714/38; 714/39; 714/42; 714/43; 714/47; 714/48; 714/56

(58) Field of Classification Search .................. 707/101, 707/103, 202; 714/1, 2, 15, 25, 33, 38, 39, 714/42, 43, 47, 48, 56
See application file for complete search history.

(56) References Cited

U.S. PATENT DOCUMENTS 5,526,480 A * 6/1996 Gibson .................. 395/154

(Continued)

OTHER PUBLICATIONS

"Benefits of Veritas Indepth for Oracle within an Operational Environment" retrieved on Jan. 16, 2007 from: http://www.dlt.com/storage/PDF/whitepapers/veritas/apm/Indepth-Oracle-Whitepaper.pdf.*

(Continued)

*Primary Examiner*—Charles Rones
*Assistant Examiner*—Harold A Hotelling
(74) *Attorney, Agent, or Firm*—Hickman Palermo Truong & Becker LLP

(57) ABSTRACT

A method and apparatus for diagnosing database performance problems using a plurality of wait classes is provided. A set of statistical data that describes current activity within a database system is periodically retrieved. The set of statistical data may include information about the current activity of each user session connected to the database system. Thereafter, a set of cumulative statistical data that describes activity in the database system over a period of time is updated to reflect the retrieved set of statistical data. The set of cumulative statistical data includes statistics associated with each of a plurality of wait classes. A graphical user interface that displays the set of cumulative statistical data may be presented to a user. The graphical user interface allows the user to quickly ascertain the nature of the database performance problems by providing a view of the set of cumulative statistical data.

53 Claims, 10 Drawing Sheets

U.S. PATENT DOCUMENTS

| | | | | |
|---|---|---|---|---|
| 6,311,327 | B1* | 10/2001 | O'Brien et al. | 717/114 |
| 6,901,582 | B1* | 5/2005 | Harrison | 717/127 |
| 6,985,901 | B1* | 1/2006 | Sachse et al. | 707/10 |
| 7,089,260 | B2* | 8/2006 | Arnold et al. | 707/102 |
| 2002/0049687 | A1* | 4/2002 | Helsper et al. | 706/45 |
| 2005/0086246 | A1* | 4/2005 | Wood et al. | 707/101 |
| 2005/0210056 | A1* | 9/2005 | Pomerantz et al. | 707/101 |

OTHER PUBLICATIONS

"Veritas Database Performance Solutions" retrieved on Jan. 16, 2007 from: http://eval.veritas.com/mktginfo/es/mx/enterprise/white_papers/performance_solutions.pdf.* pages 3-2, 3-3, 3-4, 3-11, 14-28, 15-10, 16-8, 21-15, 22-12, 22-13, 22-24, and 22-25 from: http://web.archive.org/web/20040808221329/http://www.lc.leidenuniv.nl/awcourse/oracle/server.920/a96533.pdf (archived Aug. 8, 2004) (published Mar. 2002).* pages 22-9, 22-26, 22-27, 22-37, 22-39, 22-51 from: http://web.archive.org/web/20040808221329/http://www.lc.leidenuniv.nl/awcourse/oracle/server.920/a96533.pdf (archived Aug. 8, 2004) (published Mar. 2002).* pages 22-9, 22-26, 22-27, 22-37, 22-39, 22-51, 23-6, 24-1, 24-2, 24-3, 24-6, 24-9, 24-16, 24-17, 24-20, and 24-68 from: http://web.archive.org/web/20040808221329/http://www.lc.leidenuniv.nl/awcourse/oracle/server.920/a96533.pdf (archived Aug. 8, 2004) (published Mar. 2002).*

Veritas Datasheet, Veritas Indepth™ for Oracle, undated, 4 pages.

Veritas Datasheet, Veritas Indepth™ for Oracle, undated, 4 pages, (2003).

* cited by examiner

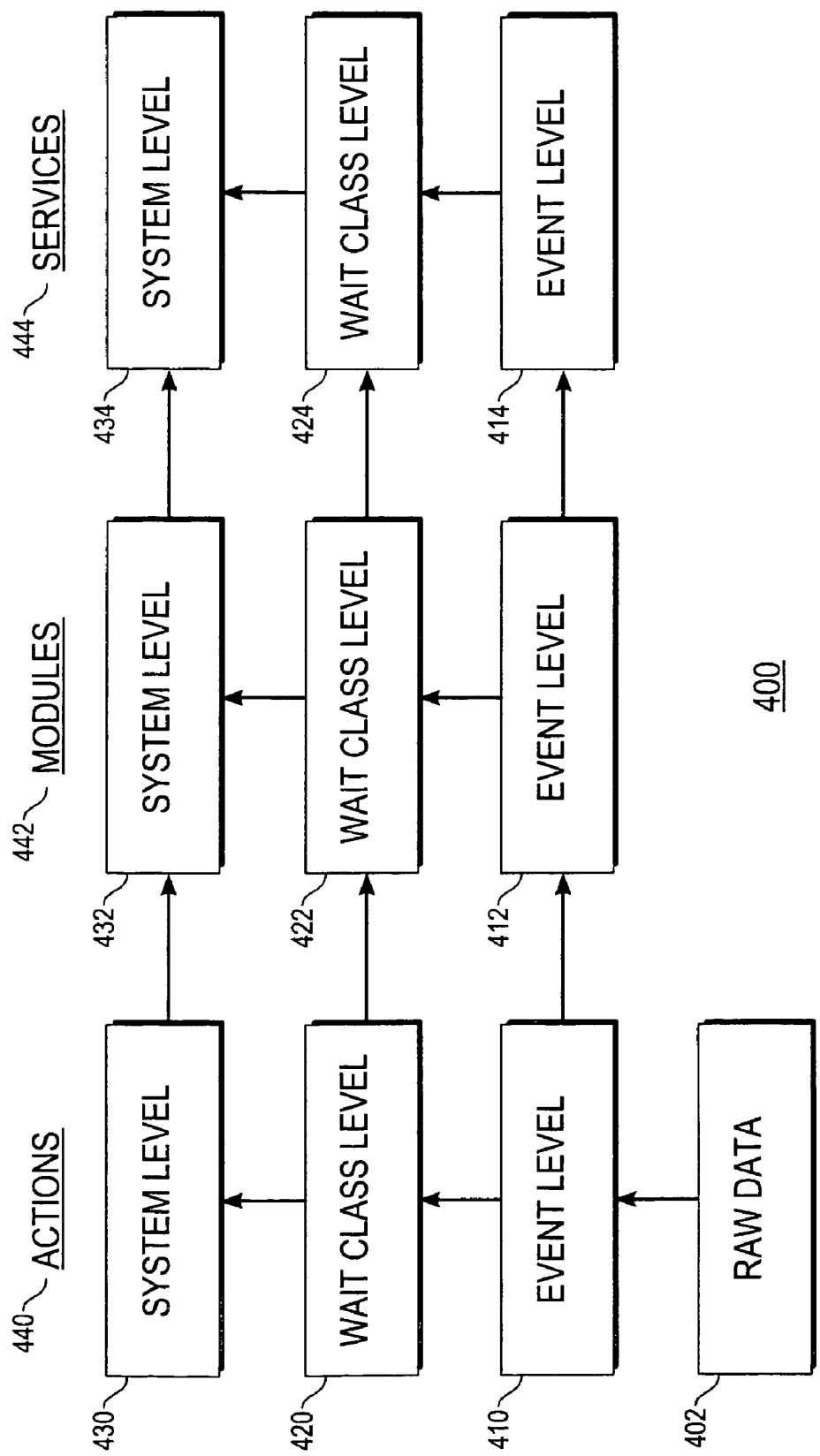

ated herein, under 35 U.S.C. § 119(e).

DIAGNOSING DATABASE PERFORMANCE PROBLEMS USING A PLURALITY OF WAIT CLASSES

RELATED APPLICATION AND CLAIM OF PRIORITY

This application claims benefit of Provisional Application Ser. No. 60/602,437, filed Aug. 17, 2004, entitled "DIAGNOSING DATABASE PERFORMANCE PROBLEMS USING A PLURALITY OF WAIT CLASSES," by Vipul Manubhai Shah et al, the entire contents of which are incorporated by reference for all purposes as if originally set forth herein, under 35 U.S.C. § 119(e).

FIELD OF THE INVENTION

The present invention relates to diagnosing database performance problems using a plurality of wait classes.

BACKGROUND

Databases occasionally may experience performance problems, e.g., a database operation to update a set of records may require an unusually long period of time to process. When a database performance problem is encountered, a database administrator may attempt to determine the source of the performance problem by using a variety of metrics that provide statistics about the current performance of various components of the database. For example, a database administrator may examine the buffer cache hit ratio to determine if the size of the buffer cache should be increased to improve performance.

Unfortunately, interpretation of these metrics leaves a great deal of discretion to the database administrator, as the metrics often may not provide a clear indication of the source of the performance problem. Further, use of these metrics is often unwieldy for the database administrator, as each metric is often analyzed using a different graphical user interface, which results in an extremely large number of graphical user interfaces for the database administrator to traverse in attempting to locate the source of the performance problem.

Consequently, an improved method and mechanism for diagnosing database performance problems without incurring the problems associated with the approaches described above is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments described herein are illustrated by way of example, and not by way of limitation, in the figures of the accompanying drawings and in which like reference numerals refer to similar elements and in which:

FIG. 4 is a block diagram illustrating the hierarchy of data aggregation according to an embodiment;

DETAILED DESCRIPTION

Figure 1:
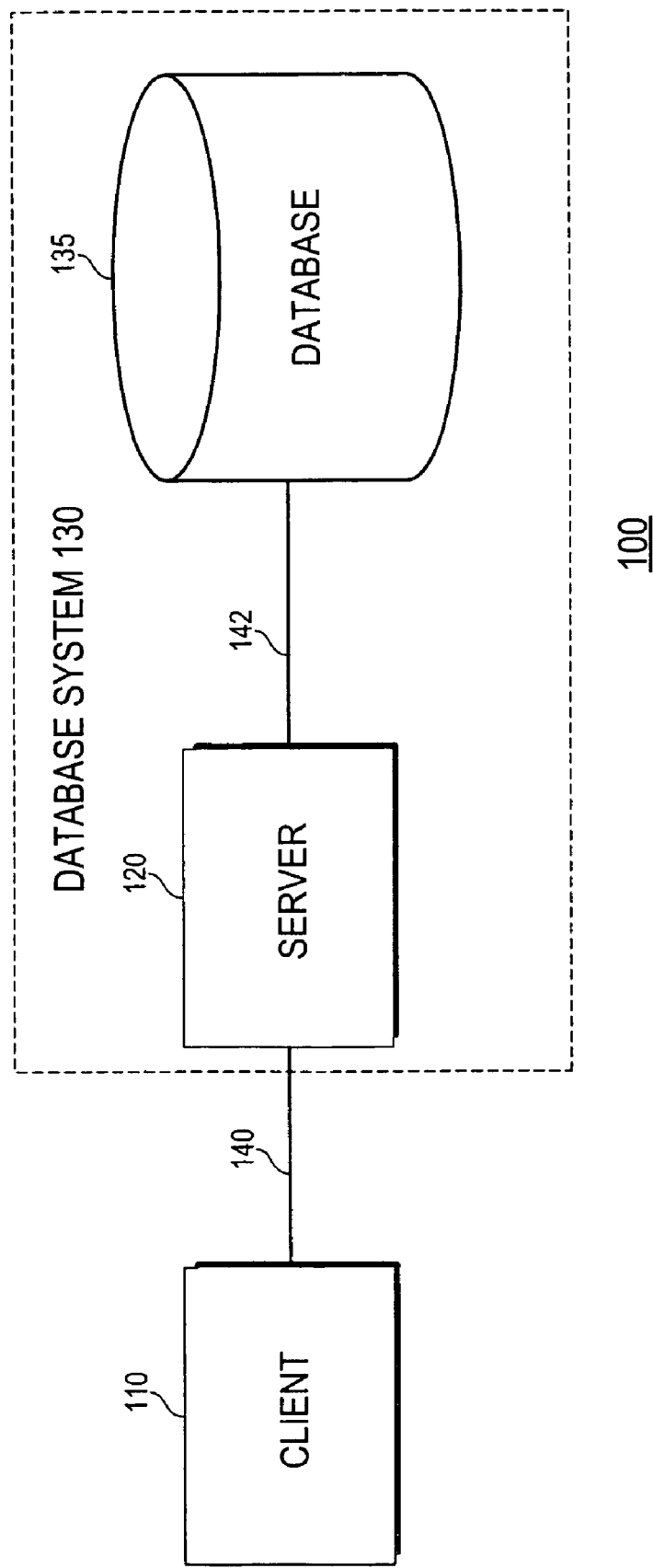
FIG. 1 is a block diagram illustrating a system according to an embodiment.

In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Functional Overview

Embodiments described herein provide for diagnosing database performance problems, such as a processing delay, using a plurality of wait classes. Each wait class corresponds to a category of database activity in which processing delays can be experienced. For example, one wait class may correspond to delays incurred during system input/output, while another wait class may correspond to delays incurred during scheduling. In the approaches described herein, embodiments allow a user to quickly determine which wait classes are associated with a processing delay by viewing data displayed on a graphical user interface. Once the user identifies one or more wait classes that are identified with a processing delay, the user may further discover more detailed information about each of the one or more wait classes to identify one or more causes of the processing delay associated with each of the one or more identified wait classes.

In an embodiment, a set of statistical data that describes current activity within a database system is periodically retrieved. The set of statistical data may be periodically retrieved by a kernel component of the database system or by a functional component external to the database system. In an embodiment, the set of statistical data includes information about the current activity of each user session connected to the database system.

After the set of statistical data is retrieved, a set of cumulative statistical data that describes activity in the database system over a period of time is updated to reflect the retrieved set of statistical data. The set of cumulative statistical data includes statistics associated with each wait class of a plurality of wait classes. For example, the set of cumulative statistical data may include statistics about activity in the database system over a period of time concerning a first wait class directed towards processing time of database activity concerning system input/output and a second wait class directed towards processing time of database activity concerning scheduling. As described in further detail below, the set of cumulative statistical data may also include data statistics associated with each wait class at different levels of granularity.

In an embodiment, a graphical user interface that displays the set of cumulative statistical data may be presented to a user. The graphical user interface quickly allows the user to ascertain the nature of the database performance problems by providing a view of the set of cumulative statistical data. Graphs, diagrams, charts, and illustrations of various styles may be presented on the graphical user interface to show statistics about database activity in each wait class for the period of time reflected in the set of cumulative statistical data.

Once a user determines that a wait class is associated with a performance delay, the user may submit input to the graphical user interface to cause the graphical user interface to display additional information about the causes of the performance delay for that wait class. In an embodiment, a user may click on a particular wait class displayed on the graphical user interface to cause another screen of the graphical user interface to be presented that displays a portion of the set of cumulative statistical data that corresponds to the particular wait class. For example, statistical information about one or more events that are included in the particular wait class may be presented on the screen. An event refers to a type of database activity that occurs within a particular wait class.

A user may also view the set of cumulative statistical data at lower levels of granularity on the graphical user interface, e.g., the user may submit input to the graphical user interface to cause another screen of the graphical user interface to be presented that displays additional statistical information about all SQL statements associated with a particular event to determine why database activity in that particular event required more processing time than other events.

Other embodiments are described in greater detail herein.

Architecture Overview

FIG. 1 is a block diagram illustrating a system 100 according to an embodiment. System 100 of FIG. 1 provides for diagnosing database performance problems using a plurality of wait classes. In an embodiment, system 100 includes a client, a database system, and communications links.

A client, such as client 110, may be implemented using any medium or mechanism that provides for presenting a graphical user interface. For example, client 110 may be any hardware or software component that facilitates the display of a graphical user interface to a user. Non-limiting, illustrative examples of client 110 include a web page, a screen, a television, a kiosk, a PC, a laptop computer, a cell phone with a screen, and a wireless device. While only one client is depicted in FIG. 1 for ease of explanation, other embodiments may comprise two or more clients. Consequently, server 120 may communicate with any number of clients over communications link 140. A user may use client 110 to diagnose database performance problems using a plurality of wait classes by viewing a set of cumulative statistical data displayed thereon that describes activity in the database system over a period of time.

A database system, such as database system 130, is a software system that is responsible for the management, storage, and retrieval of data. A database system includes one or more servers and at least one database.

A server, such as server 120, may be implemented using any medium or mechanism that is capable of retrieving and storing data in a database. Server 120 may render a graphical user interface on client 110. In an embodiment, server 120 may also update and maintain the set of cumulative statistical data. While only one server 120 is depicted in FIG. 1 for ease of explanation, embodiments may comprise two or more servers 120. Server 120 may be implemented on the same computer system as database 135 (not shown), or may be implemented on a different computer system than database 135 (as illustrated in FIG. 1).

A database, such as database 135, may be implemented using any medium or mechanism for persistently storing data. Non-limiting, illustrative examples of database 135 include, a relational database, an object-oriented database, and a multi-dimensional database. While only one database 135 is depicted in FIG. 1 for ease of explanation, embodiments may comprise two or more databases 135.

Communications link 140 may be implemented by any medium or mechanism that provides for the exchange of data between client 110 and server 120. Similarly, communications link 142 may be implemented by any medium or mechanism that provides for the exchange of data between server 120 and database 135. Examples of communications links 140 and 142 include, without limitation, a network such as a Local Area Network (LAN), Wide Area Network (WAN), Ethernet or the Internet, or one or more terrestrial, satellite or wireless links.

Diagnosing Database Performance Problems

Figure 2:
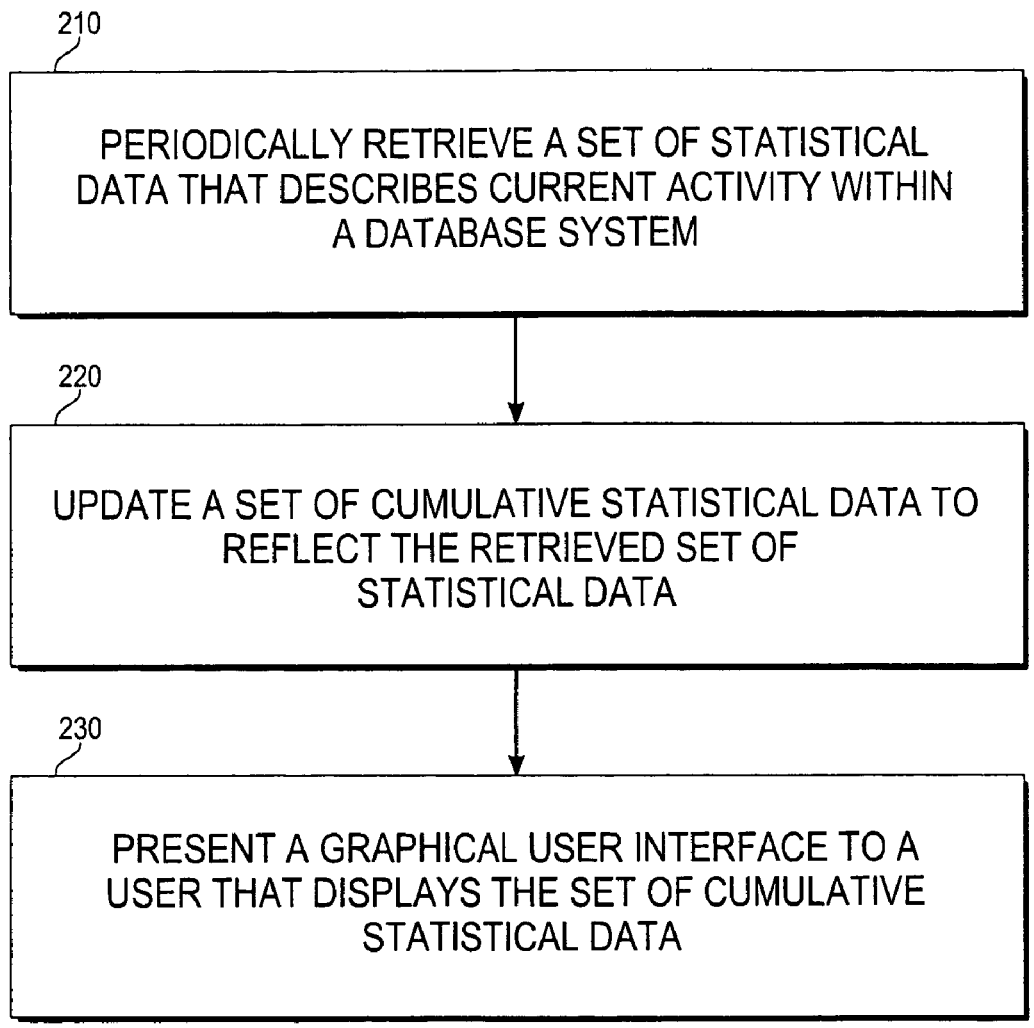
FIG. 2 is a flowchart illustrating the functional steps performed in diagnosing database performance problems according to an embodiment.

FIG. 2 is a flowchart illustrating the functional steps performed in diagnosing database performance problems according to an embodiment. The steps of FIG. 2 shall be explained with reference to diagnosing a database performance problem, such as a processing delay, in database 135. Using the steps of FIG. 2, data about the activity within database 135 over a period of time is collected. The data is aggregated across multiple levels to allow a user, such as an administrator, to view the activity within database 135 at different levels of granularity. The data may be presented to the administrator on a graphical user interface to enable the administrator to drill down to lower levels of granularity to further identify a cause of a performance problem. For example, if a particular wait class is identified as contributing the most to the amount of time the state of processing in the database is not performing useful work (i.e., the CPU is waiting), the administrator may drill down on that wait class to be presented information about that wait class to further identify the cause of the performance problem in that wait class.

Turning to FIG. 2, in step 210, a set of statistical data that describes current activity within a database system is periodically retrieved. The set of statistical data retrieved in step 210 may include information about activities performed by all user sessions that are associated with database 135 at the time step 210 is performed.

For example, the set of statistical data retrieved in step 210 may include, for each user session currently active in database 135, information describing the activity of that user session, such as whether the user is associated with either a request that is being processed by the CPU or a request that is waiting to be processed. If a request associated with a user is waiting to be processed, the set of statistical data retrieved in step 210 may further include information that describes the request and why the request is waiting to be processed, e.g., which wait class and event is associated with the request, what SQL statement is associated with the request, which application issued the request, etc.

In an embodiment, step 210 may be performed in a kernel component of database 135. In such an embodiment, information about the activity of each user session active in database 135 may be retrieved and stored by a kernel component of database 135. For example, one implementation includes a data structure called activity session history (ASH). The ASH data structure may periodically (e.g. every second) sample the activity of all user sessions in the database and store the set of statistical data in memory at or accessible to server 120.

In another embodiment, step 210 may be performed external to database 135. A functional component outside of database 135 may periodically retrieve information about the activity of each user session active in database 135. For example, in an embodiment that does not contain the active session history (ASH) data structure discussed above, server 120 may periodically (e.g., every 15 seconds) retrieve information about the activity of each user session active in database 135.

As step 210 may be performed periodically, e.g., step 210 may be performed once upon every occurrence of a configurable period of time, or after the occurrence of a particular event. The set of statistical data retrieved each time in step 210 may reflect a different set of user sessions, as one or more users sessions may be added or removed in-between the performance of step 210. After step 210 has been performed one or more times, step 220 may be performed.

In step 220, a set of cumulative statistical data is updated to reflect the set of statistical data retrieved in step 210. The set of cumulative statistical data describes activity in database 135 over a period of time. For example, the set of cumulative statistical data may describe activity in database 135 over a two-month period. In an embodiment, the set of cumulative statistical data is updated to reflect the set of statistical data retrieved in step 210 by adding the set of statistical data retrieved in step 210 to the set of cumulative statistical data.

Step 220 may be performed at a variety of locations, as the set of cumulative statistical data may be stored and updated in a variety of locations. For example, if step 210 is performed at database 135, then the set of cumulative statistical data may be stored at either database 135 or at server 120. If step 210 is performed at server 120, then the set of cumulative statistical data may be stored may be performed at server 120.

Step 220 may be performed periodically to update the set of cumulative statistical data to reflect the set of statistical data retrieved. In other words, step 220 need not be performed after each time step 210 is performed; rather, for efficiency purposes, step 220 may be performed after one set of statistical data is retrieved (step 210 is performed once), or after multiple sets of statistical data are retrieved (step 210 is performed two or more times).

In an embodiment, the set of cumulative statistical data may periodically be saved in a persistent store to enable longer periods of database activity to be analyzed. For example, if the set of cumulative statistical data describes activity in the database system over a two-year period, then processing delays experienced by the database system over the two-year period may be analyzed. However, it is likely the set of cumulative statistical data for that two-year period will be too large to be stored in volatile memory; consequently, the set of cumulative statistical data may be periodically saved to a persistent store, such as a file server or a database, after the occurrence of a configurable period of time or when the set of cumulative statistical data exceeds a specified size.

Figure 3:
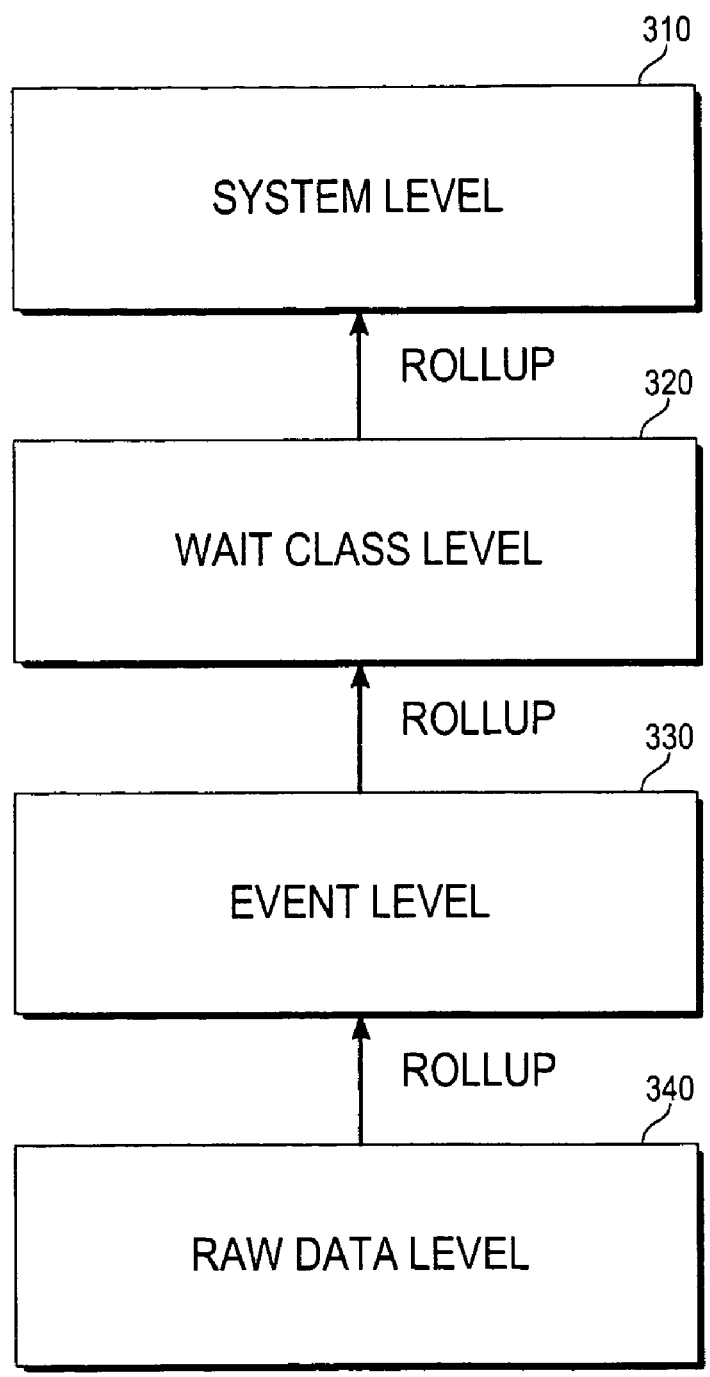
FIG. 3 is a block diagram of the different levels of hierarchies of the set of cumulative statistical data according to an embodiment.

Organizing the Set of Cumulative Statistical Data in Different Levels of Granularity The set of cumulative statistical data updated in step 220 may include statistics organized at different levels of granularity. FIG. 3 is a block diagram of the different levels of granularity of a set of cumulative statistical data according to an embodiment. Each level depicted in FIG. 3 corresponds to a level of granularity in which one could view the set of cumulative statistical data. As FIG. 3 illustrates, the set of cumulative statistical data may include statistics associated with the system level 310, the class level 320, the event level 330, and the raw data level 340. As discussed in greater detail below, data may be aggregated (or "rolled up") from the raw data level 340 to the event level 330, aggregated from the event level 330 to the wait class level 320, and thereafter aggregated from the wait class level 320 to the system level 310. Each level shall now be discussed in greater detail below.

The set of cumulative statistical data includes statistics associated with each wait class of a plurality of wait classes. Each wait class corresponds to a category of database activity in which processing delays are experienced. As depicted in FIG. 3, the system level 310 provides a system-wide view of the database performance problems of database 135. The set of cumulative statistical data may include statistics organized at the system level 310 by including statistics associated with all wait classes of a plurality of wait classes.

The wait class level 320 provides a view of the database performance problems of database 135 associated with a particular wait class. Each wait class may comprise one or more events. An event refers to a type of database activity that occurs within a particular wait class. The set of cumulative statistical data may include statistics organized at the wait class level 320 by including statistics associated with each event within a particular wait class. The set of cumulative statistical data may include statistics associated with each event within each wait class.

Embodiments may employ a variety of different wait classes; consequently, the exact number and nature of wait classes may vary from implementation to implementation. In an embodiment, the plurality of wait classes includes the wait classes listed in Table 1.

| Wait Class | Description |
| --- | --- |
| User I/O | Processing delays in the User I/O wait class include Disk input/output delays associated with foreground system processes. |
| System I/O | Processing delays in the System I/O wait class include Disk input/output delays associated with background system processes, e.g., a log writer process, a process that flushes data blocks, and a process that performs achieve functionality. |
| Scheduler | Processing delays in the Scheduler wait class include delays due to a resource manager. |
| Network | Processing delays in the Network wait class are experienced due to network messaging delays. For example, delays in the network wait class include delays due to network congestion or network latency. |
| Configuration | Processing delays in the Configuration wait class are experienced as a result of a badly configured system. |
| Concurrency | Processing delays in the Concurrency wait class are experienced in a system with high concurrency. |
| Commit | Processing delays in the Commit wait class refers to delays in committing transactions, e.g., delays in writing to a log file involved in committing a transaction. |
| Application | Processing delays in the Application wait class are caused by the manner in which an application is designed, e.g., row lock delays or other locks that are requested by an application either explicitly or implicitly. |
| Administrative | Processing delays in the Administrative wait class are imposed by a privileged user by some action. |
| Other | Processing delays in the Other wait class include all other delays that do not fit into any other wait class or are not important to classify. |

Each event may be recorded in raw data that describes activities of that event. For example, an event may comprise one or more database transactions. Non-limiting, illustrative examples of what kinds of raw data may describe a particular event include a SQL statement, SQL id, which module issued a particular transaction, or other information describing a particular transaction in database 135. The event level 330 provides a view of the database transactions associated with a particular event. Consequently, the set of cumulative statistical data may include statistics organized at the event level 330 by including statistics associated with all the raw data, e.g., data about particular database transactions, associated with a particular event.

The raw data level 340 provides a view of the database performance problems of database 135 associated with all the raw data pertaining to particular database transactions or database commands. Consequently, the set of cumulative statistical data may include statistics organized at the raw data level 340 by including statistics associated with the raw data pertaining to a particular database command or a particular database transaction, e.g., a particular SQL statement.

Aggregating the Set of Cumulative Statistical Data

In an embodiment, data in the set of cumulative statistical data may be aggregated (or "rolled up") across one or more of the levels depicted in FIG. 3. The purpose of aggregating data in the set of cumulative statistical data is to collect statistics from a low level of granularity to obtain statistics about a higher level of granularity to help the administrator quickly identify causes of any processing delays experienced by database 135. For example, aggregating data in the set of cumulative statistical data includes collecting or gathering data in the set of cumulative statistical data from one hierarchy level (such as raw data level 340) to a higher hierarchy level (such as the event level 330) as depicted in FIG. 3. The various methods of aggregating data in the set of cumulative statistical data shall now be discussed according to embodiments.

FIG. 4 is a block diagram illustrating the hierarchy of data aggregation according to an embodiment. As FIG. 4 illustrates, raw data collected in the set of cumulative statistical data retrieved in step 210 may be aggregated vertically from the raw data level 340 (represented in box 402) to the event level 330 (represented by boxes 410, 412, and 414) to the wait class level 320 (represented by boxes 420, 422, and 424) to the system level 310 (represented by boxes 430, 432, and 434).

To illustrate, a portion of the set of cumulative statistical data that corresponds to statistics organized at the system level 310 may be formed by aggregating one or more portions of the set of the set of cumulative statistical data that correspond to each of the plurality of wait classes. A portion of the set of cumulative statistical data that corresponds to statistics associated with a particular wait class in the plurality of wait classes (i.e., the wait class level 320) may be formed by aggregating one or more portions of the set of the set of cumulative statistical data that correspond to the plurality of events contained within that particular wait class. Also, a portion of the set of cumulative statistical data that correspond to statistics associated with a particular event (i.e., the event level 330) may be formed by aggregating one or more portions of the set of cumulative statistical data that correspond to statistics associated with all the raw data within that particular event.

As FIG. 4 illustrates, statistics in the set of cumulative statistical data may also be aggregated horizontally across different levels of granularity. Statistics associated with particular actions performed in database 135 may be aggregated to form statistics associated with a particular module performing multiple actions in database 135. For example, if a particular module performs multiple actions in database 135, statistics about each of the actions performed in database 135 (represented by boxes in the action column 440) may be aggregated to form statistics associated with all the actions performed by that particular module (represented by boxes in module column 442). Also, statistics associated with particular module in database 135 may be aggregated to form statistics associated all modules performing a particular service in database 135. For example, if several modules collectively perform a service in database 135, statistics about each of the modules performing the service in database 135 (represented by boxes in the module column 442) may be aggregated to form statistics associated with the service (represented by boxes in service column 444).

FIG. 4 is merely illustrative, as other embodiments of the invention may aggregate data either horizontally or vertically across levels not depicted in FIG. 4.

As shall be explained in further detail below, aggregating the set of cumulative statistical data across different levels allows the administrator to quickly identify a cause of a processing delay in database 135 at a high level of granularity, and thereafter drill down to determine the more specific reasons why the processing delay is being experienced.

The set of cumulative statistical data may be aggregated at different times and using different portions of the set of cumulative statistical data to promote efficiency. In an embodiment, data in the set of cumulative statistical data may be aggregated whenever the set of cumulative statistical data is updated to reflect the set of statistical data retrieved in step 210. However, for the sake of efficiency, the act of aggregation may be performed in a manner to reduce to processing required to update the set of cumulative statistical data to reflect the set of statistical data in step 210. Several methods for performing aggregation in an efficient manner shall be discussed below.

Figure 5A:
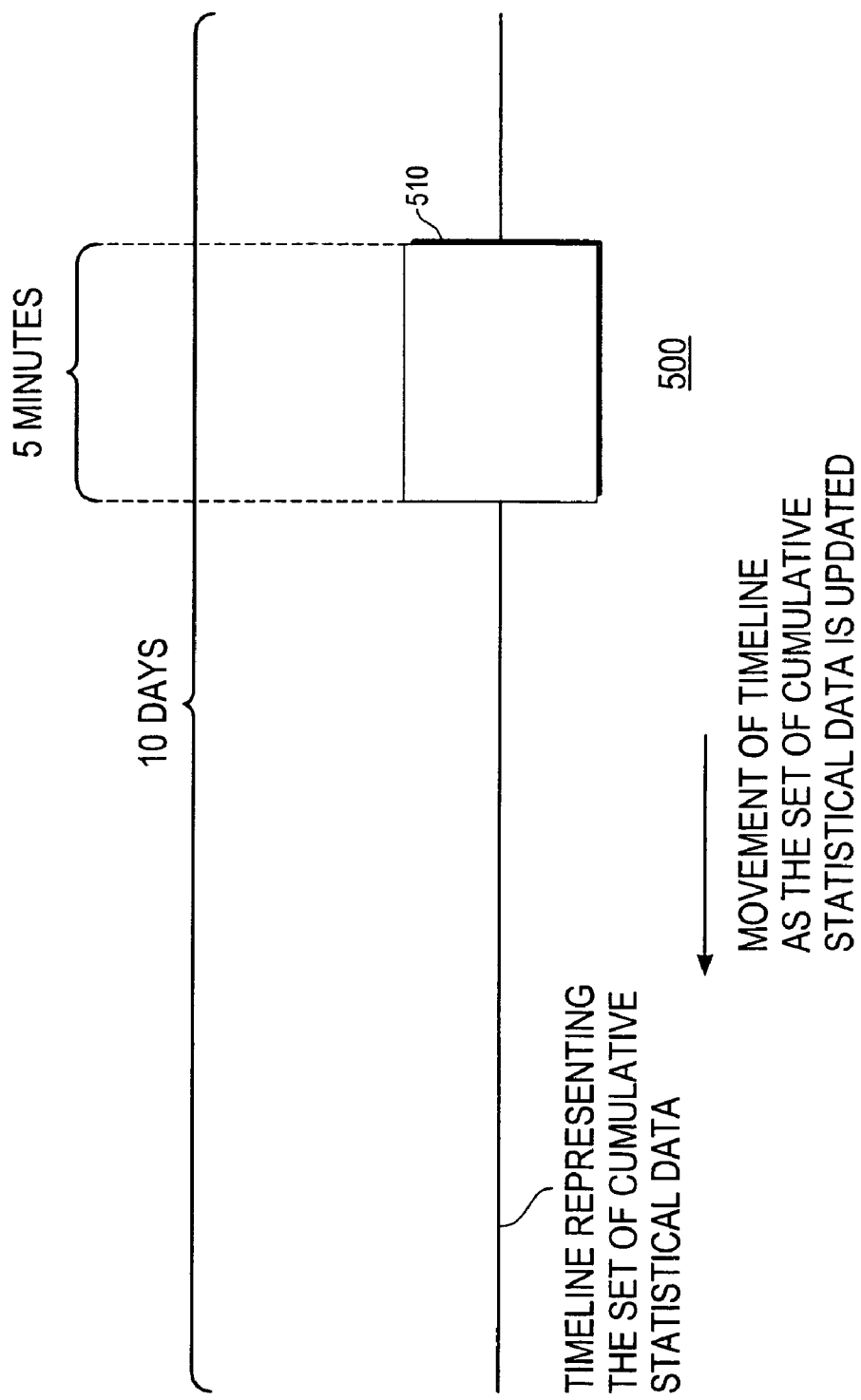
FIG. 5A is a first illustration of a timeline displaying the set of cumulative statistical data according to an embodiment.

In an embodiment, only a portion of the set of cumulative statistical data corresponding to a configurable period of time is aggregated. This embodiment may be useful when an administrator may only be interested in analyzing a portion of the set of cumulative statistical data. FIG. 5A is a first illustration of a timeline illustrating a set of cumulative statistical data describing activity in database 135 for 10 days. As the timeline represents the set of cumulative statistical data, and the set of cumulative statistical data is updated to reflect new statistic data upon every performance of step 220, data will be added to the right side of the timeline as the set of cumulative statistical data is updated to reflect the retrieved set of statistical data in step 220. Thus, if an administrator is interested in viewing database activity across a specified window (or interval) of time, data in that five-minute window (represented by window 510) will change in real time to reflect the real-time activities of database 135 in that window.

If the database administrator only wishes to view activity in database 135 for a five-minute window, then aggregating the entire set of cumulative statistical data corresponding to the 10 day period of time would be unnecessary. Thus, only the portion of the set of cumulative statistical data that corresponds to the desired period of time that an administrator wishes to view is aggregated, thus reducing the amount of computational resources required to aggregate the data. Each time that the set of cumulative statistical data in the window that the administrator wishes to view changes, a new portion of the set of cumulative statistical data must be aggregated.

Figure 5B:
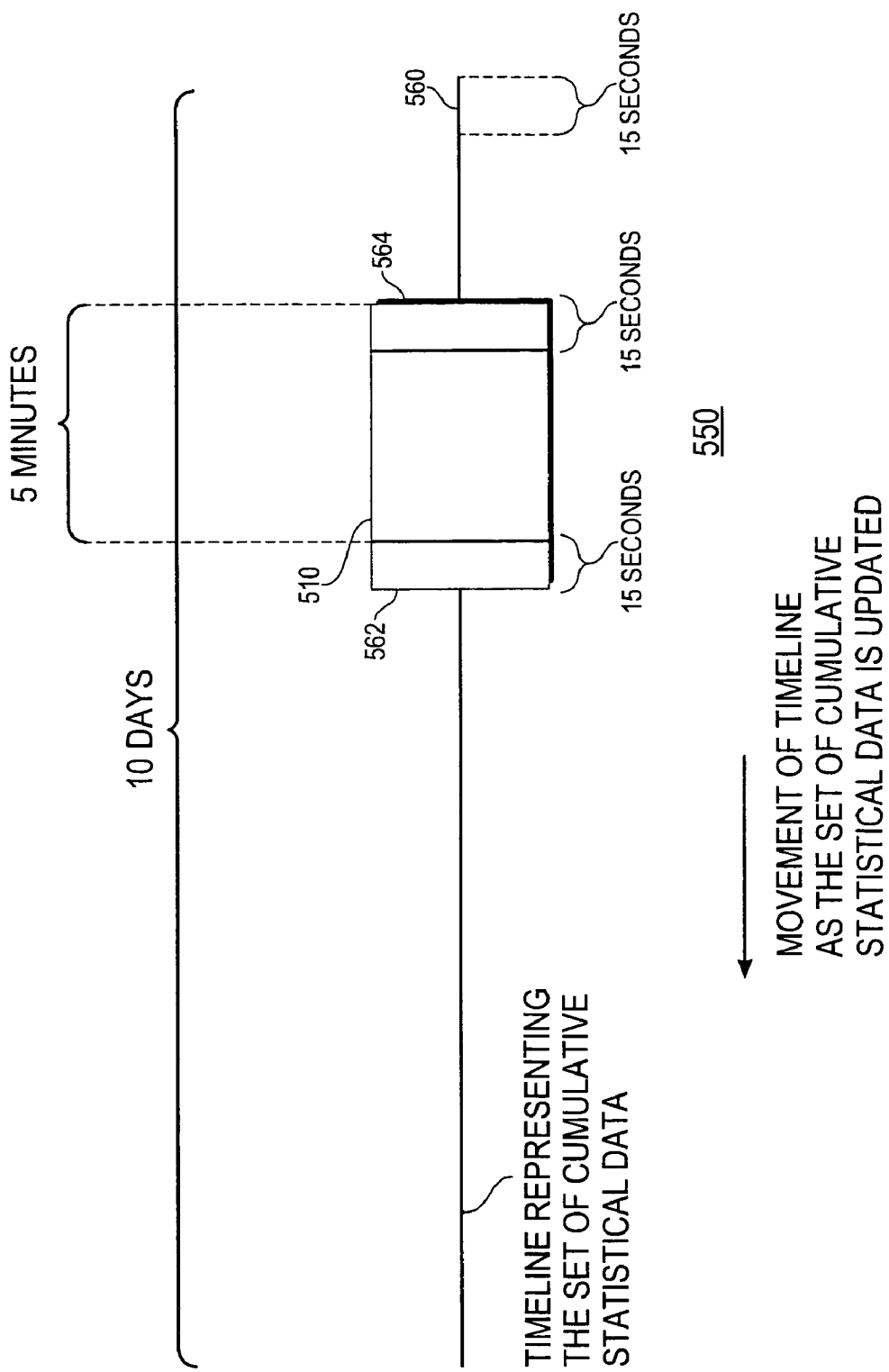
FIG. 5B is a second illustration of a timeline displaying the set of cumulative statistical data according to an embodiment.

In another embodiment, only the portion of the set of cumulative statistical data that changed is aggregated. Consider FIG. 5B, which is a second illustration of a timeline displaying the set of cumulative statistical data according to an embodiment. In FIG. 5B, upon the performance of step 220, the set of cumulative statistical data (represented by the timeline) is updated to reflect a new set of statistical data 560 that corresponds to a 15 second period of time. Consequently, data within the five-minute window 510 that the administrator is interested in viewing advances 15 seconds. Thus, a portion 562 of the set of cumulative statistical data is no longer in the window, while a portion 564 of the set of cumulative statistical data has been added to the window.

Instead of aggregating the entire five-minute window again, the portion 562 of the set of cumulative statistical data that is no longer in the window is removed from aggregated data, and only a portion 564 of the set of cumulative statistical data that has been added to the window is aggregated. In other words, the set of cumulative statistical data that was previously aggregated to generate statistics at each level of granularity is used by the system 100 in addition to the aggregated portion 564. Data must be maintained that identifies portion 562, e.g., the portion of the statistical data that is no longer included in the aggregated portion needs to be identifiable so that it may be removed. Such an embodiment may be advantageous as it minimizes the load on database 135 in aggregating data in the set of cumulative statistical data.

After step 220 has been performed at least once, step 230 may be performed.

Displaying the Set of Cumulative Statistical Data to the User

In step 230, a graphical user interface that displays the set of cumulative statistical data is presented to a user, such as an administrator. The graphical user interface may be presented by server 120 for display on client 110 in response to server 120 receiving a request from client 110 to present the graphical user interface on client 110.

The graphical user interface of step 230 may comprise one or more screens that each displays various graphs, diagrams, charts, and illustrations depicting the set of cumulative statistical data. Using the graphical user interface, an administrator may view the set of cumulative statistical data to quickly identify any processing delays in database 135, and may determine what cause(s) are associated with any processing delays by viewing the set of cumulative statistical data at various levels of granularity. The graphical user interface may display statistics that describes the processing delays in database 135 by wait class, and may enable an administrator to drill down upon a selected wait class to learn more about the processing delays associated with the selected wait class. Several embodiments of graphical user interfaces that may be presented in step 230 shall now be discussed below.

Figure 6A:
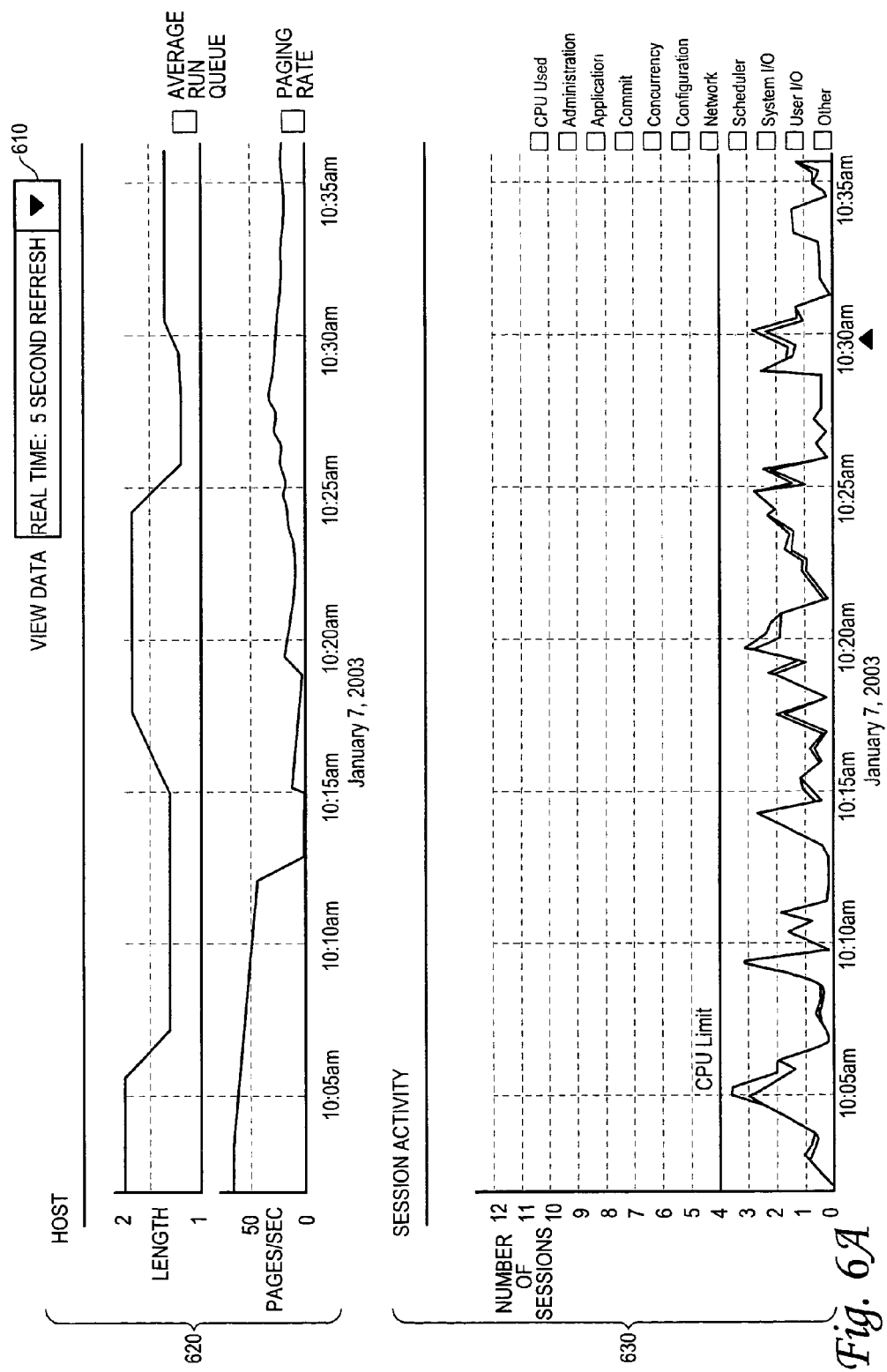
FIG. 6A is an illustration of a first graphical user interface according to an embodiment.
Figure 6B:
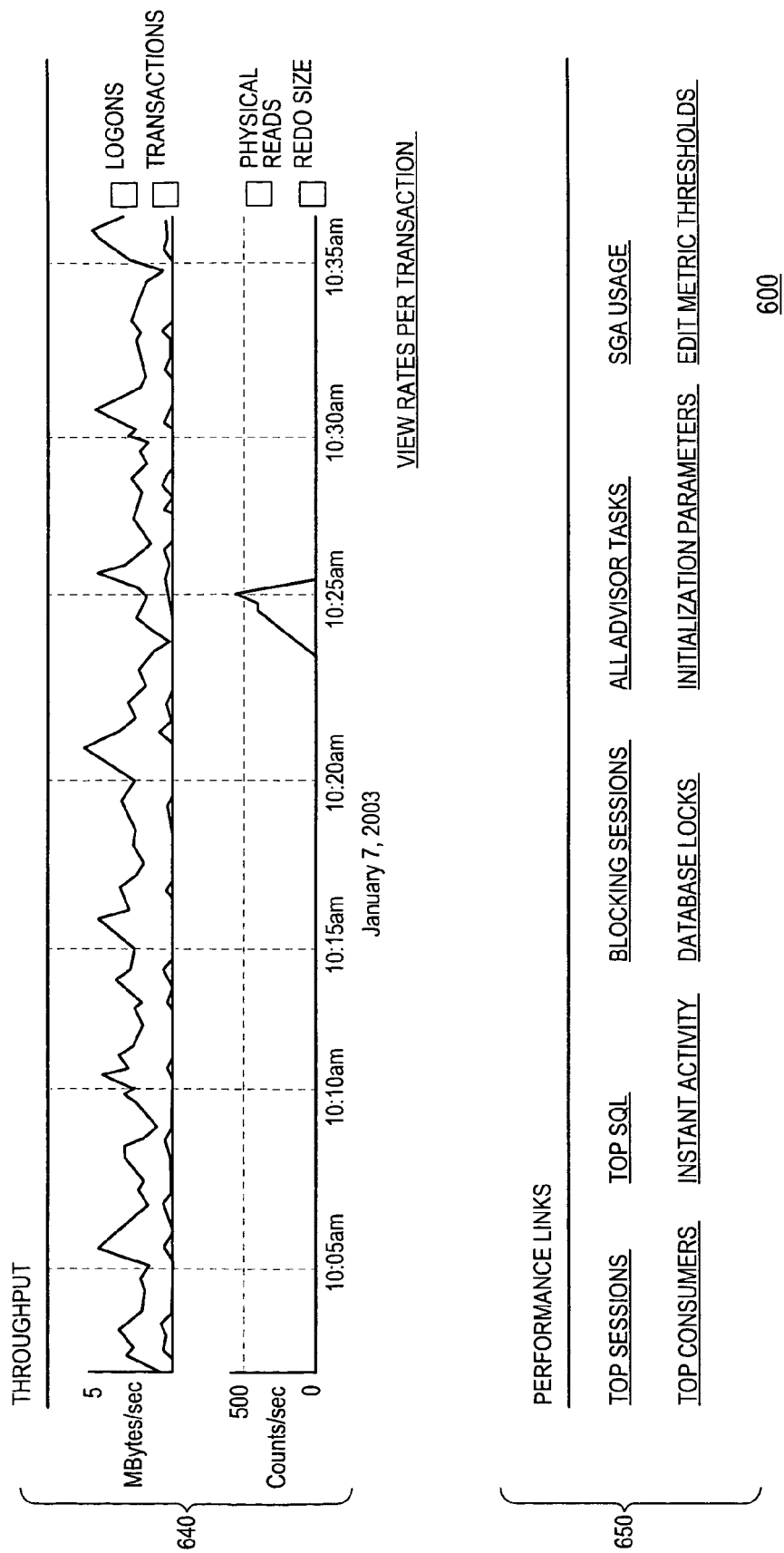
FIG. 6B is an illustration of a first graphical user interface according to an embodiment.

FIG. 6A and FIG. 6B are illustrations of a graphical user interface 600 according to an embodiment. FIG. 6A depicts the first half of the graphical user interface 600, while FIG. 6B depicts the second half of the graphical user interface 600. The graphical user interface (GUI) 600 of FIGS. 6A and 6B comprises a refresh control 610, a host display 620, a session activity display 630, an instance throughput display 640, and set of performance links 650. Refresh control 610 allows an administrator to configure how often data is refreshed on GUI 600. For example, using refresh control 610, an administrator may configure GUI 600 to refresh data displayed thereon every five seconds.

Host display 620 presents data that describes the activity associated with the host machine of database 135. Host display 620 allows an administrator to determine if a cause of a processing delay in database 135 lies in database 135 or in the machine upon which database 135 is implemented. For example, if database 135 is implemented on a computer system that is experiencing processing delays, it is possible that processing delays associated with database transactions performed in database 135 may be caused by the computer system implementing database 135, rather than database 135 itself. Consequently, host display 620 allows an administrator to quickly determine if processing delays are the result of the host machine or database 135.

If the administrator determines that a processing delay is caused by database 135, then the administrator may use session activity display 630 to determine the cause(s) of the processing delay within database 135. Session activity display 630 presents data that describes the cause(s) of processing delays in database 135. The session activity display 630 may present data about the activity of database 135 over a period of time, e.g., GUI 600 presents a timeline of activity for database 135 from 10:00 AM to 10:35 AM. The period of time covered by the statistics presented in session activity display 630 may be configured by the user to include any period of time reflected in the set of cumulative statistical data.

Session activity display 630 may present data in the set of cumulative statistical data corresponding to the system level 310. Session activity display 630, as shown in FIG. 6A, displays activity in database 135 for a plurality of wait classes. The activity of database 135 corresponding to each wait class may be depicted by session activity display 630 in a different color in accordance with the key displayed on the right side of session activity display 630. An administrator may quickly determine which wait class contributed the most to a processing delay experienced at a specified point in time by viewing session activity display 630; the amount of area that is bounded by a wait class corresponds to how much that wait class contributed to the processing delay. Thus, the wait class that is associated with the largest area for a particular time contributed the most to the processing delay at that time.

If an administrator wishes to view additional details about the processing delay associated with a particular wait class, the administrator may select the particular wait class on session activity display 630, and another screen of the GUI 600 will be presented to the administrator that presents the additional details about the particular wait class. For example, in an embodiment, if an administrator clicks on a particular wait class displayed on session activity display 630, another screen of GUI 600 is presented to the administrator that displays a portion of the set of cumulative statistical data that corresponds to selected wait class. In this way, the administrator can drill down on a selected wait class to learn more about the specific causes that result in a performance delay through GUI 600. The process of drilling down through session activity display 630 shall be explained in greater detail below after the explanation of GUI 600.

GUI 600 may include an instance throughput display 640, which presents data that describes the throughput of database 135. Throughput display 640 provides additional information that may assist an administrator diagnosis a processing delay in database 135; for example, a processing delay in database 135 may be caused, at least in part, by excessive throughput in database 135. Throughput display 640 provides a context to Session activity display 630. If Throughput display 640 indicates that there is a high throughput and Session activity display 630 indicates that there is high session activity, then the database activity may be normal, as the database has a high degree of active sessions, but these sessions are generating the high levels of detected throughput. On the other hand, if Throughput display 640 indicates low levels of throughput, but Session activity display 630 indicates high levels of session activity, then the database may be experiencing a performance problem, as this indicates that a lot of sessions are waiting and not much work is being performed in the database.

GUI 600 may also include a set of performance links 650, each of which may be a link that, when selected, presents another screen of the GUI 600 that visually represents a portion of the set of cumulative statistical data that is directed towards the topic associated with the link. For example, a first link in the set of performance links 650, entitled "Top Sessions," may display a portion of the set of cumulative statistical data that describes the top sessions experiencing processing delays in database 135 and a second link in the set of performance links 650, entitled "Top SQL," may display a portion of the set of cumulative statistical data that describes the top SQL statements contributing to processing delays in database 135.

GUI 600 is merely illustrative; other embodiments of the invention may visual render the set of cumulative statistical information in other manners not depicted to allow an administrator to quickly determine the cause(s) of a processing delay within database 135.

Note that step 230 is optional and is not an essential step of the invention. In embodiments that do not perform step 230, the administrator may perform statistical analysis on the set of cumulative statistical data to determine a cause of any processing delays in database 135.

Drilling Down to Lower Levels of Granularity on the Graphical User Interface

A user may cause the set of cumulative statistical data to be presented on a graphical user interface at a lower level of granularity to determine a cause of why a particular processing delay is experienced. A user may view the set of cumulative statistical data at any level of granularity upon which the set of cumulative statistical data is aggregated, e.g., the user may view the set of cumulative statistical data across multiple vertical levels of granularity or multiple horizontal levels of granularity.

For example, an administrator may view additional details about a particular wait class depicted in GUI 600 of FIG. 6A and FIG. 6B by selecting a particular wait class on GUI 600. In other words, if a user was presented with GUI 600 that displayed a set of cumulative statistical data that indicated that database activity in a wait class describing the processing time of database activity concerning system input/output required more processing time than any other wait class, the administrator may click on that wait class to cause another screen of GUI 600 to be presented that displays additional statistical information about all events in the system input/output wait class to enable the administrator to determine why database activity in the selected wait class required more processing time than any other wait class.

Figure 7:
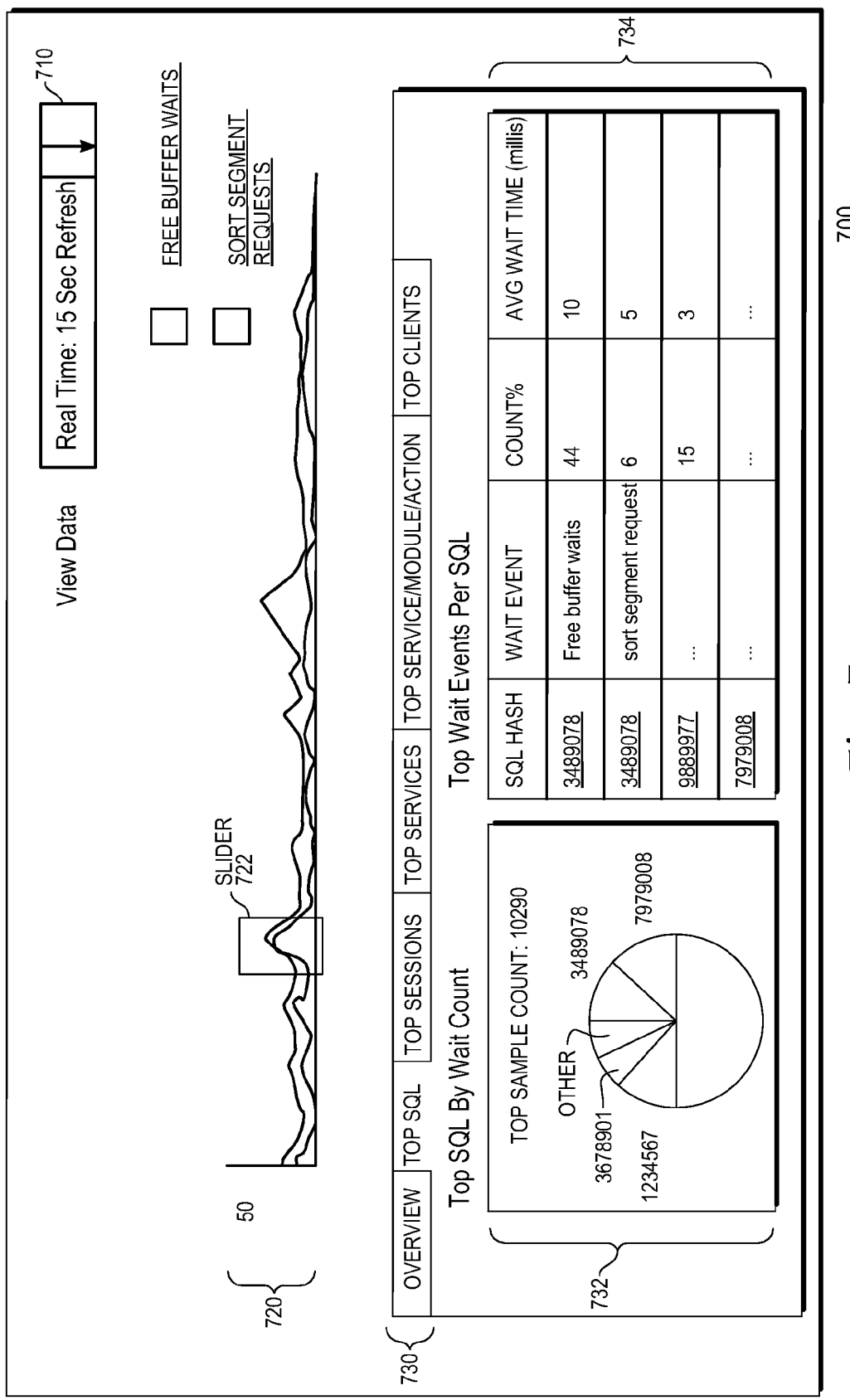
FIG. 7 is an illustration of a second graphical user interface according to an embodiment.

FIG. 7 is an illustration of a second graphical user interface (GUI) 700 according to an embodiment. GUI 700 may visually depict the set of set of cumulative statistical data at a lower level of granularity than GUI 600. The GUI 700 depicted in FIG. 7 may be presented to a user in response to that user request to view the set of cumulative statistical data at a lower level of granularity.

In an embodiment, GUI 700 includes a refresh control 710, a session activity display 720, a slider 722, a set of tabs 730, a visual representation 732, and a table 734. Refresh control 710 allows an administrator to configure how often data is refreshed on GUI 700. For example, using refresh control 710, an administrator may configure GUI 700 to refresh data displayed thereon every fifteen seconds.

Session activity display 720 displays the set of cumulative statistical data at a specified level of granularity. Session activity display 720 may display the set of cumulative statistical data at any level of granularity depicted in FIG. 4. The level of granularity to which session activity display 720 displays the set of cumulative statistical data may be specified in a variety of manners. In an embodiment, the level of granularity at which session activity display 720 displays the set of cumulative statistical data may be determined by a link that the administrator selected, e.g., the selection of a particular link in the set of performance links 650 may cause GUI 700 to be displayed with session activity display 720 displaying the set of cumulative statistical data at a particular level of granularity.

In another embodiment, the level of granularity at which session activity display 720 displays the set of cumulative statistical data may be one level of granularity lower than the level of granularity upon which the administrator previously viewed and drilled down upon. For example, if an administrator viewed GUI 600 which visually depicted the set of cumulative statistical data at the system level 310, and thereafter the administrator clicked upon a particular wait class in the session activity display 630, then GUI 700 of FIG. 7 may be presented that includes session activity display 720 that visually depicts the set of cumulative data at the wait class level 320 that is associated with the particular wait class selected by the administrator.

GUI 700 may be employed by embodiments to visually depict the set of cumulative statistical data at different levels of granularity. In a further example, if the administrator viewed GUI 700 visually depicting the set of cumulative statistical data at the associated with the particular wait class selected by the administrator, and thereafter the administrator clicked upon a particular event depicted in the session activity display 630, then another graphical user interface (such as GUI 700) may be presented that includes a session activity display 720 that visually depicts the set of cumulative data at the event class level 330 that is associated with the particular event selected by the administrator. Thereafter, if the administrator clicked upon a particular unit of raw data depicted in the session activity display 630, then another graphical user interface (such as GUI 700) may be presented that includes a session activity display 720 that visually depicts the set of cumulative data at the raw data level 340 that is associated with the particular unit of raw data selected by the administrator.

The session activity display 720 may include a timeline that depicts the set of cumulative statistical data over a period of time. Additional details about the set of cumulative statistical data may be viewed for a particular point in time. In an embodiment, in response to receiving input from the administrator, GUI 700 may be presented that displays a portion of the set of cumulative statistical data that corresponds to a point in time specified by the administrator. For example, the administrator may specify which point in time of which the additional details of the set of cumulative statistical data should describe by positioning a slider 722 in the timeline rendered in session activity display 720.

Since the set of cumulative statistical data may describe activity in database 135 over a period of time, historical analysis of performance problems of database 135 may be performed. An administrator may position the slider 722 on session activity display 720 to cause GUI 700 to display the set of cumulative statistical data at a point in time not contemporaneous with the current time that is reflected in the set of cumulative statistical data, e.g., the set of cumulative statistical data displayed on GUI 700 may correspond to thirty minutes ago, a day ago, or a year ago. Thus, the administrator may diagnose performance problems that occurred in database 135 for any period of time that is reflected in the set of cumulative statistical data.

The set of tabs 730 allow an administrator to determine how the administrator would like to view information displayed in the visual representation 732 and table 734 that reflects the set of cumulative statistical data being displayed in the activity session display 720 at the point in time specified by the slider 722. After the administrator selects a particular tab in the set of tabs 730, the visual representation 732 and the table 734 are updated to display the set of cumulative statistical data in accordance with the selected tab in the set of tabs 730 and in view of the level of granularity depicted in the activity session display 720.

The visual representation 732 may be a graph, diagram, chart, or illustration that depicts the set of cumulative statistical data in accordance with the selected tab in the set of tabs 730 and in view of the level of granularity depicted in the activity session display 720. The table 734 may be a table that describes further details about the set of cumulative statistical data in accordance with the selected tab in the set of tabs 730 and in view of the level of granularity depicted in the activity session display 720.

For example, GUI 700 depicted in FIG. 7 depicts the set of cumulative statistical data associated with a particular wait class. In GUI 700, the "Top SQL" tab in the set of tabs 732 is selected. Visual representation 732 displays a pie chart of the top SQL statements in the particular wait class shown in GUI 700. Table 734 describes the top events in the particular wait class shown in GUI 700.

Each tab in the set of tabs 730 may correspond to a different manner in which the set of cumulative statistical data may be aggregated. For example, each way that the set of cumulative statistical data may be vertically aggregated may correspond to a particular tab in the set of tabs 730, e.g., the "Top SQL" tab discussed above. Also, a tab in the set of tabs 730 may correspond to a manner of horizontal aggregation, e.g., a selected "Top Services" tab could display information in the visual representation 732 and table 730 about a top service at the service level 444. For example, the information shown in visual representation 732 and table 730 after selecting the "Top Services" tab may be horizontally aggregated from the corresponding information in "Top Modules" tab.

The GUI 700 of FIG. 7 is merely illustrative; other embodiments of the invention may visual render the set of cumulative statistical information at a lower level of granularities in other manners not depicted in FIG. 7 to allow an administrator to quickly determine the cause(s) of a processing delay within database 135. Note that GUI 700 of FIG. 7 may be employed to depict the set of cumulative statistical information at any level of granularity, e.g., statistics in the set of cumulative statistical data associated with the raw data level 340, the event level 330, and the wait class level 320 may be displayed on GUI 700 in embodiments. In this way, a common graphical user interface is presented to the user to enable the user to view the set of cumulative statistical data associated at multiple levels of granularities.

Performance Optimizations

Embodiments may store and maintain objects that provide information used in presenting the graphical user interface of step 230 in an efficient manner. Objects may be stored in a cache at or accessible to server 220 to facilitate the efficient rendering of graphical user interfaces upon client 210 by server 220. In an embodiment, one or more objects in the cache may be marked for deletion only upon determining that the user associated with the one or more objects has not accessed any screen of any graphical user interface of a system 100 in a specified period of time. Such an embodiment advantageously ensures the one or more objects associated with a user will not be deleted from the cache until the user does not use any portion of the system 100 for a specified period of time.

In an embodiment, portions of the set of cumulative statistical data may be deleted if the portion is determined to not be statistically relevant to promote efficient storage of the set of cumulative statistical data and aggregation of the set of cumulative statistical data. In such an embodiment, a portion of the set of cumulative statistical data is identified that corresponds to statistics associated with a particular level of granularity, e.g., the system level 340, that do not meet a specified threshold, and the identified portion is removed from the set of cumulative statistical data.

The specified threshold may be expressed using a variety of metrics. In an embodiment, the specified threshold is the top five contributors to the processing delay associated with a particular level of granularity. For example, if a particular unit of raw data in the raw data level 340 is not within the top five contributors to the processing delay in a particular event, then that unit of raw data is deleted.

Implementing Mechanisms

Figure 8:
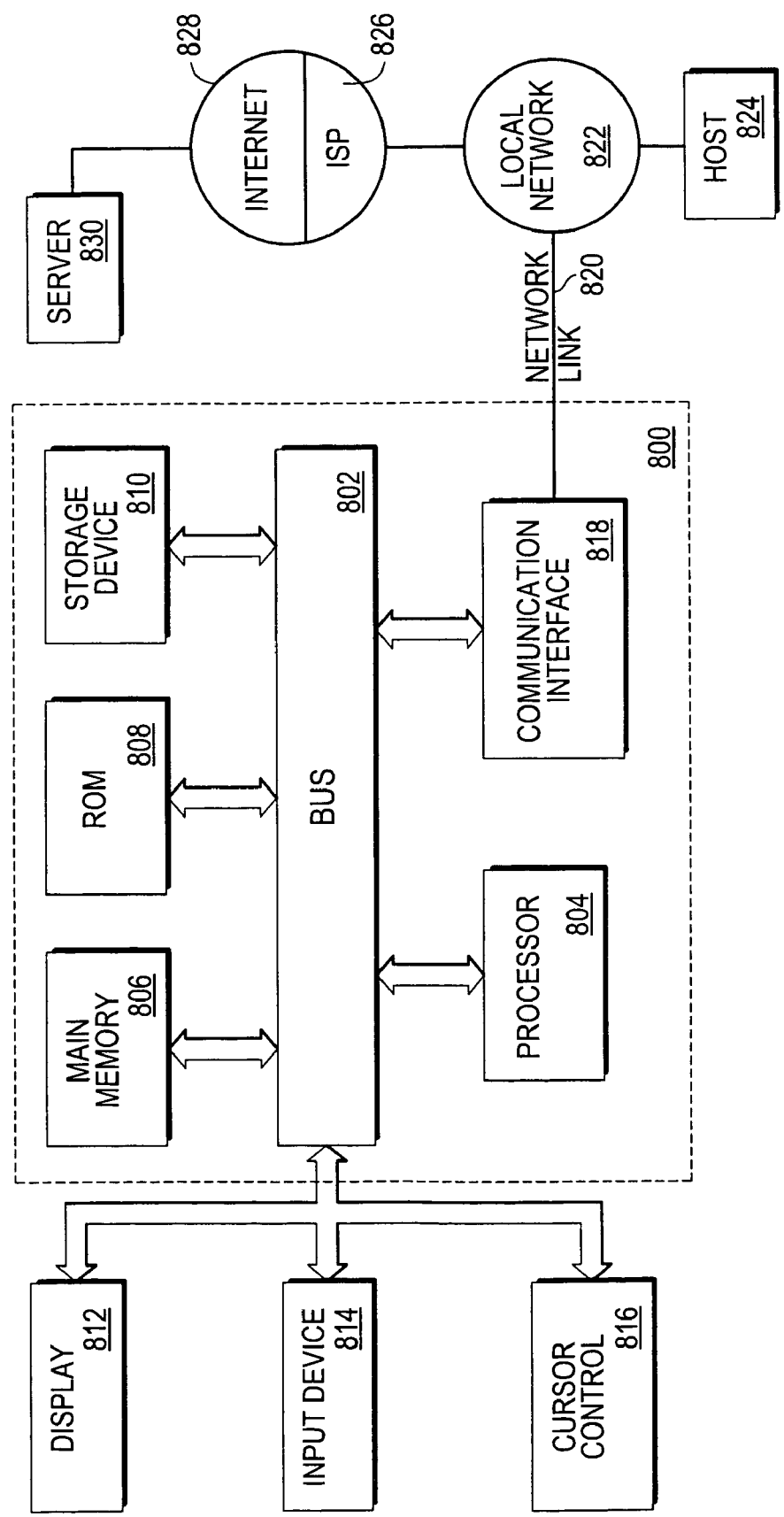
FIG. 8 is a block diagram that illustrates a computer system upon which an embodiment may be implemented.

In an embodiment, client 110, server 120, or database 135 may be implemented upon a computer system. FIG. 8 is a block diagram that illustrates a computer system 800 upon which an embodiment may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising the steps of:

periodically retrieving, within a database system, a set of statistical data that describes current activity within the database system;

updating a set of cumulative statistical data to reflect the retrieved set of statistical data, wherein the set of cumulative statistical data describes activity in the database system over a period of time, wherein the set of cumulative statistical data includes a distinct set of cumulative statistics for each wait class of a plurality of wait classes, wherein each wait class of the plurality of wait classes:
   (a) includes a different set of events than each other wait class of the plurality of wait classes,
   (b) has a distinct set of cumulative statistics that reflect occurrence of events that are included in the wait class, (c) is associated with only a single different cause of processing delay than each other wait class of the plurality of wait classes, and wherein events that are produced by each cause of processing delay are included in the wait class associated with the cause of processing delay;

wherein the plurality of wait classes includes multiple wait classes selected from the set consisting of:
(1) a wait class that corresponds only to disk input/output delays that are associated with only foreground processes of the database system,
(2) a wait class that corresponds only to disk input/output delays that are associated with only background processes of the database system,
(3) a wait class that corresponds only to delays that result from a resource manager,
(4) a wait class that corresponds only to delays that result from network congestion or network latency,
(5) a wait class that corresponds only to delays that result from a configuration of the database system,
(6) a wait class that corresponds only to delays in committing transactions,
(7) a wait class that corresponds only to delays that are caused by a manner in which an application is designed to request locks on resources in the database system, and
(8) a wait class that corresponds only to delays that are imposed by a privileged user of the database system; and wherein the steps are performed on one or more computing devices.

2. The method of claim 1, further comprising:
presenting to a user a graphical user interface that displays a display that is based on the set of cumulative statistical data.

3. The method of claim 2, wherein the graphical user interface is a first graphical user interface, and the method further comprises:
in response to receiving input from the user, presenting to the user a second graphical user interface that displays a display that is based on a portion of the set of cumulative statistical data that describes activity about a different level of granularity than the first graphical user interface.

4. The method of claim 2, wherein the graphical user interface is a first graphical user interface, wherein each of the plurality of wait classes contains a plurality of events, and the method further comprises:
in response to receiving input from the user, presenting to the user a second graphical user interface that displays a display that is based on a portion of the set of cumulative statistical data that describes activity about one member of the group consisting of: a single wait class of the plurality of wait classes, a single event of the plurality of events, and a single unit of raw data for an event of the plurality of events.

5. The method of claim 2, wherein:
the graphical user interface is one of a plurality of graphical user interfaces; and
the method further comprises:
storing in a cache one or more objects that provide information to be presented on at least one of the plurality of graphical user interfaces; and
indicating that the one or more objects are candidates for deletion from the cache only upon determining that the user has not accessed any one of the plurality of graphical user interfaces for a specified period of time.

6. The method of claim 1, further comprising:
in response to receiving input from a user, presenting to the user a graphical user interface that displays a display based on a portion of the set of cumulative statistical data that corresponds to a point in time specified by the user.

7. The method of claim 6, wherein the user specifies the point in time by positioning a slider on a timeline presented on the graphical user interface.

8. The method of claim 6, wherein the point in time is not contemporaneous with the current time, and wherein the set of cumulative statistical data is stored in a persistent store.

9. The method of claim 1, wherein each of the plurality of wait classes contains a plurality of events, and wherein the method further comprises:
aggregating data that corresponds to the plurality of events contained within a particular wait class, of the plurality of wait classes, to create cumulative statistics for the particular wait class.

10. The method of claim 1, wherein each of the plurality of wait classes contains a plurality of events, and wherein the method further comprises:
aggregating one or more portions of the set of cumulative statistical data that corresponds to transactions performed on a database, that are associated with a particular event of the plurality of events, to create a portion of the set of cumulative statistical data that corresponds to the particular event.

11. The method of claim 1, further comprising:
aggregating a first portion of the set of cumulative statistical data either horizontally or vertically from a first level of granularity to a second level of granularity.

12. The method of claim 1, further comprising:
identifying a portion of the set of cumulative statistical data that corresponds to statistics that do not meet a specified threshold; and
removing the identified portion from the set of cumulative statistical data.

13. The method of claim 1, wherein the step of periodically retrieving the set of statistical data is performed in a kernel component of the database system.

14. The method of claim 1, wherein the step of periodically retrieving the set of statistical data is performed external to the database system.

15. The method of claim 1, wherein the set of statistical data resides on a persistent store, and the method further comprises:
periodically adding statistics to the set of cumulative statistical data.

16. The method of claim 1, further comprising:
determining a cause of a processing delay in a database for a point in time described by the set of cumulative statistical data.

17. A machine-implemented method, comprising the steps of:
periodically retrieving a set of statistical data that describes current activity within a database system;
updating a set of cumulative statistical data to reflect the retrieved set of statistical data, wherein the set of cumulative statistical data describes activity in the database system over a period of time,
wherein the set of cumulative statistical data includes a distinct set of cumulative statistics for each wait class of a plurality of wait classes,
wherein each wait class of the plurality of wait classes:
(a) includes a different set of events than each other wait class of the plurality of wait classes, (b) has a distinct set of cumulative statistics that reflect occurrence of events that are included in the wait class, (c) is associated with only a single different cause of processing delay than each other wait class of the plurality of wait classes, and wherein events that are produced by each cause of processing delay are included in the wait class associated with the cause of processing delay, wherein the plurality of wait classes includes multiple wait classes selected from the set consisting of:
- a wait class that corresponds to only disk input/output delays that are associated with only foreground processes of the database system,
- a wait class that corresponds to only disk input/output delays that are associated with only background processes of the database system,
- a wait class that corresponds to only delays that result from a resource manager,
- a wait class that corresponds to only delays that result from network congestion or network latency,
- a wait class that corresponds to only delays that result from a configuration of the database system,
- a wait class that corresponds to only delays in committing transactions,
- a wait class that corresponds to only delays that are caused by a manner in which an application is designed to request locks on resources in the database system, and
- a wait class that corresponds to only delays that are imposed by a privileged user of the database system; and presenting to a user a graphical user interface that displays a display that is based on the set of cumulative statistical data, wherein said graphical user interface is configured to update the display to show additional information about a particular wait class of the plurality of wait classes in response to receiving user input that identifies the particular wait class, and wherein said user input is transmitted by a single mouse click;

wherein the steps are performed on one or more computing devices.

18. A machine-readable storage medium storing one or more sequences of instructions, wherein execution of the one or more sequences of instructions by one or more processors causes the one or more processors to perform the steps of:

periodically retrieving, within a database system, a set of statistical data that describes current activity within the database system; and updating a set of cumulative statistical data to reflect the retrieved set of statistical data, wherein the set of cumulative statistical data describes activity in the database system over a period of time, wherein the set of cumulative statistical data includes a distinct set of cumulative statistics for each wait class of a plurality of wait classes, wherein each wait class of the plurality of wait classes:
- (a) includes a different set of events than each other wait class of the plurality of wait classes,
- (b) has a distinct set of cumulative statistics that reflect occurrence of events that are included in the wait class,
- (c) is associated with only a single different cause of processing delay than each other wait class of the plurality of wait classes, and wherein events that are produced by each cause of processing delay are included in the wait class associated with the cause of processing delay;

wherein the plurality of wait classes includes multiple wait classes selected from the set consisting of:
- a wait class that corresponds to only disk input/output delays that are associated with only foreground processes of the database system,
- a wait class that corresponds to only disk input/output delays that are associated with only background processes of the database system,
- a wait class that corresponds to only delays that result from a resource manager,
- a wait class that corresponds to only delays that result from network congestion or network latency,
- a wait class that corresponds to only delays that result from a configuration of the database system,
- a wait class that corresponds to only delays in committing transactions,
- a wait class that corresponds to only delays that are caused by a manner in which an application is designed to request locks on resources in the database system, and
- a wait class that corresponds to only delays that are imposed by a privileged user of the database system.

19. The machine-readable storage medium of claim 18, wherein execution of the one or more sequences of instructions by the one or more processors further causes the one or more processors to perform the step of:

presenting to a user a graphical user interface that displays a display that is based on the set of cumulative statistical data.

20. The machine-readable storage medium of claim 19, wherein the graphical user interface is a first graphical user interface, and wherein execution of the one or more sequences of instructions by the one or more processors further causes the one or more processors to perform the step of:

in response to receiving input from the user, presenting to the user a second graphical user interface that displays a display that is based on a portion of the set of cumulative statistical data that describes activity about a different level of granularity than the first graphical user interface.

21. The machine-readable storage medium of claim 19, wherein the graphical user interface is a first graphical user interface, wherein each of the plurality of wait classes contains a plurality of events, and wherein execution of the one or more sequences of instructions by the one or more processors further causes the one or more processors to perform the step of:

in response to receiving input from the user, presenting to the user a second graphical user interface that displays a display that is based on a portion of the set of cumulative statistical data that describes activity about one member of the group consisting of: a single wait class of the plurality of wait classes, a single event of the plurality of events, and a single unit of raw data for an event of the plurality of events.

22. The machine-readable storage medium of claim 19, wherein:

the graphical user interface is one of a plurality of graphical user interfaces; and execution of the one or more sequences of instructions by the one or more processors further causes the one or more processors to perform the steps of:
storing in a cache one or more objects that provide information to be presented on at least one of the plurality of graphical user interfaces; and indicating that the one or more objects are candidates for deletion from the cache only upon determining that the user has not accessed any one of the plurality of graphical user interfaces for a specified period of time.

23. The machine-readable storage medium of claim 18, wherein execution of the one or more sequences of instructions by the one or more processors further causes the one or more processors to perform the step of:

in response to receiving input from a user, presenting to the user a graphical user interface that displays a display based on a portion of the set of cumulative statistical data that corresponds to a point in time specified by the user.

24. The machine-readable storage medium of claim 23, wherein the user specifies the point in time by positioning a slider on a timeline presented on the graphical user interface.

25. The machine-readable storage medium of claim 23, wherein the point in time is not contemporaneous with the current time, and wherein the set of cumulative statistical data is stored in a persistent store.

26. The machine-readable storage medium of claim 18, wherein each of the plurality of wait classes contains a plurality of events, and wherein execution of the one or more sequences of instructions by the one or more processors further causes the one or more processors to perform the step of:

aggregating data that corresponds to the plurality of events contained within a particular wait class, of the plurality of wait classes, to create cumulative statistics for the particular wait class.

27. The machine-readable storage medium of claim 18, wherein each of the plurality of wait classes contains a plurality of events, and wherein execution of the one or more sequences of instructions by the one or more processors further causes the one or more processors to perform the step of:

aggregating one or more portions of the set of cumulative statistical data that corresponds to transactions performed on a database, that are associated with a particular event of the plurality of events, to create a portion of the set of cumulative statistical data that corresponds to the particular event.

28. The machine-readable storage medium of claim 18, wherein execution of the one or more sequences of instructions by the one or more processors further causes the one or more processors to perform the step of:

aggregating a first portion of the set of cumulative statistical data either horizontally or vertically from a first level of granularity to a second level of granularity.

29. The machine-readable storage medium of claim 18, wherein execution of the one or more sequences of instructions by the one or more processors further causes the one or more processors to perform the steps of:

identifying a portion of the set of cumulative statistical data that corresponds to statistics that do not meet a specified threshold; and removing the identified portion from the set of cumulative statistical data.

30. The machine-readable storage medium of claim 18, wherein the step of periodically retrieving the set of statistical data is performed in a kernel component of the database system.

31. The machine-readable storage medium of claim 18, wherein the step of periodically retrieving the set of statistical data is performed external to the database system.

32. The machine-readable storage medium of claim 18, wherein the set of statistical data resides on a persistent store, and wherein execution of the one or more sequences of instructions by the one or more processors further causes the one or more processors to perform the step of:

periodically adding statistics to the set of cumulative statistical data.

33. The machine-readable storage medium of claim 18, wherein execution of the one or more sequences of instructions by the one or more processors further causes the one or more processors to perform the step of:

determining a cause of a processing delay in a database for a point in time described by the set of cumulative statistical data.

34. A machine-readable storage medium storing one or more sequences of instructions, wherein execution of the one or more sequences of instructions by one or more processors causes the one or more processors to perform the steps of:

periodically retrieving a set of statistical data that describes current activity within a database system;

updating a set of cumulative statistical data to reflect the retrieved set of statistical data, wherein the set of cumulative statistical data describes activity in the database system over a period of time, wherein the set of cumulative statistical data includes a distinct set of cumulative statistics for each wait class of a plurality of wait classes, wherein each wait class of the plurality of wait classes:
  (a) includes a different set of events than each other wait class of the plurality of wait classes,
  (b) has a distinct set of cumulative statistics that reflect occurrence of events that are included in the wait class,
  (c) is associated with only a single different cause of processing delay than each other wait class of the plurality of wait classes, and wherein events that are produced by each cause of processing delay are included in the wait class associated with the cause of processing delay, wherein the plurality of wait classes includes multiple wait classes selected from the set consisting of:
  a wait class that corresponds to only disk input/output delays that are associated with only foreground processes of the database system,
  a wait class that corresponds to only disk input/output delays that are associated with only background processes of the database system,
  a wait class that corresponds to only delays that result from a resource manager,
  a wait class that corresponds to only delays that result from network congestion or network latency,
  a wait class that corresponds to only delays that result from a configuration of the database system,
  a wait class that corresponds to only delays in committing transactions,
  a wait class that corresponds to only delays that are caused by a manner in which an application is designed to request locks on resources in the database system, and
  a wait class that corresponds to only delays that are imposed by a privileged user of the database system; and presenting to a user a graphical user interface that displays a display that is based on the set of cumulative statistical data, wherein said graphical user interface is configured to update the display to show additional information about a particular wait class of the plurality of wait classes in response to receiving user input that identifies the particular wait class, and wherein said user input is transmitted by a single mouse click.

35. The machine-readable storage medium of claim 18, wherein one of the plurality of wait classes corresponds to disk input/output delays that are associated with only foreground processes of the database system.

36. The machine-readable storage medium of claim 18, wherein one of the plurality of wait classes corresponds to disk input/output delays that are associated with only background processes of the database system.

37. The machine-readable storage medium of claim 18, wherein one of the plurality of wait classes corresponds to delays that result from a resource manager of the database system.

38. The machine-readable storage medium of claim 18, wherein one of the plurality of wait classes corresponds to delays that result from network congestion or network latency.

39. The machine-readable storage medium of claim 18, wherein one of the plurality of wait classes corresponds to delays that result from a configuration of the database system.

40. The machine-readable storage medium of claim 18, wherein one of the plurality of wait classes corresponds to delays that result from an amount of concurrency within the database system.

41. The machine-readable storage medium of claim 18, wherein one of the plurality of wait classes corresponds to delays in committing transactions.

42. The machine-readable storage medium of claim 18, wherein one of the plurality of wait classes corresponds to delays that are caused by a manner in which an application is designed to request locks on resources in the database system.

43. The machine-readable storage medium of claim 18, wherein one of the plurality of wait classes corresponds to delays that are imposed by a privileged user of the database system.

44. The machine-readable storage medium of claim 18, wherein:
   one of the plurality of wait classes corresponds to disk input/output delays that are associated with only foreground processes of the database system; and
   another of the plurality of wait classes corresponds to disk input/output delays that are associated with only background processes of the database system.

45. The method of claim 1, wherein one of the plurality of wait classes corresponds to disk input/output delays that are associated with only foreground processes of the database system.

46. The method of claim 1, wherein one of the plurality of wait classes corresponds to disk input/output delays that are associated with only background processes of the database system.

47. The method of claim 1, wherein one of the plurality of wait classes corresponds to delays that result from a resource manager of the database system.

48. The method of claim 1, wherein one of the plurality of wait classes corresponds to delays that result from network congestion or network latency.

49. The method of claim 1, wherein one of the plurality of wait classes corresponds to delays that result from a configuration of the database system.

50. The method of claim 1, wherein one of the plurality of wait classes corresponds to delays in committing transactions.

51. The method of claim 1, wherein one of the plurality of wait classes corresponds to delays that are caused by a manner in which an application is designed to request locks on resources in the database system.

52. The method of claim 1, wherein one of the plurality of wait classes corresponds to delays that are imposed by a privileged user of the database system.

53. The method of claim 1, wherein:
   one of the plurality of wait classes corresponds to disk input/output delays that are associated with only foreground processes of the database system; and
   another of the plurality of wait classes corresponds to disk input/output delays that are associated with only background processes of the database system.

* * * * *